(12) United States Patent
Konno

(10) Patent No.: US 7,301,299 B2
(45) Date of Patent: Nov. 27, 2007

(54) INJECTION MOLDING MACHINE AND A CONTROL METHOD OF AN INJECTION MOLDING MACHINE

(75) Inventor: Takeshi Konno, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/239,281

(22) Filed: Sep. 30, 2005

(65) Prior Publication Data

US 2006/0017416 A1 Jan. 26, 2006

Related U.S. Application Data

(63) Continuation of application No. PCT/JP04/04581, filed on Mar. 31, 2004.

(30) Foreign Application Priority Data

Apr. 4, 2003 (JP) .............................. 2003-102008

(51) Int. Cl.
*G05D 15/01* (2006.01)

(52) U.S. Cl. .................. 318/646; 318/645; 264/40.1; 264/40.5

(58) Field of Classification Search ............. 318/645, 318/632, 646; 425/149; 264/40.5, 40.1
See application file for complete search history.

(56) References Cited

U.S. PATENT DOCUMENTS

| | | | | |
|---|---|---|---|---|
| 3,860,801 A | * | 1/1975 | Hunkar | 700/203 |
| 4,094,940 A | * | 6/1978 | Hold | 264/40.6 |
| 4,242,073 A | * | 12/1980 | Tsuchiya et al. | 425/149 |
| 4,816,196 A | * | 3/1989 | Otake | 264/40.1 |
| 4,816,197 A | * | 3/1989 | Nunn | 264/40.6 |
| 4,828,473 A | * | 5/1989 | Otake et al. | 425/145 |
| 4,847,023 A | * | 7/1989 | Neko | 264/40.1 |
| 5,030,395 A | * | 7/1991 | Kamiguchi et al. | 264/40.5 |
| 5,154,935 A | * | 10/1992 | Kamiguchi et al. | 425/149 |
| 5,248,460 A | * | 9/1993 | Tsutsumi | 264/40.5 |
| 5,413,311 A | * | 5/1995 | Arstein et al. | 251/331 |
| 5,469,038 A | * | 11/1995 | Silvey | 318/632 |
| 5,514,311 A | * | 5/1996 | Shimizu et al. | 264/40.1 |
| 5,540,577 A | * | 7/1996 | Ishikawa et al. | 425/150 |
| 5,853,630 A | * | 12/1998 | Hettinga | 264/40.5 |
| 5,854,967 A | * | 12/1998 | Hearst et al. | 422/186.3 |
| 5,906,778 A | * | 5/1999 | Arai et al. | 264/40.1 |
| 6,163,130 A | * | 12/2000 | Neko et al. | 318/806 |
| 6,814,558 B2 | * | 11/2004 | Kubota et al. | 425/145 |
| 6,835,337 B2 | * | 12/2004 | Sasaki et al. | 264/40.1 |
| 6,858,303 B2 | * | 2/2005 | Gorny et al. | 428/412 |
| 2003/0180985 A1 | * | 9/2003 | Katou et al. | 438/106 |

FOREIGN PATENT DOCUMENTS

| | | |
|---|---|---|
| JP | 2001-293762 | 10/2001 |
| JP | 2002-301749 | 10/2002 |

* cited by examiner

*Primary Examiner*—Rita Leykin
(74) *Attorney, Agent, or Firm*—Squire Sanders & Dempsey L.L.P.

(57) ABSTRACT

An injection molding machine has a control device which controls an input to an incorporated motor. The control device sets a setting value a setting value of the motor to be held for a predetermined setting time. Additionally, the control device determines a reduction ratio which causes the setting value to be reduced according to passage of time, and controls the input to the motor based on the reduction ratio. Thereby, a power consumption of the motor is reduced.

14 Claims, 6 Drawing Sheets

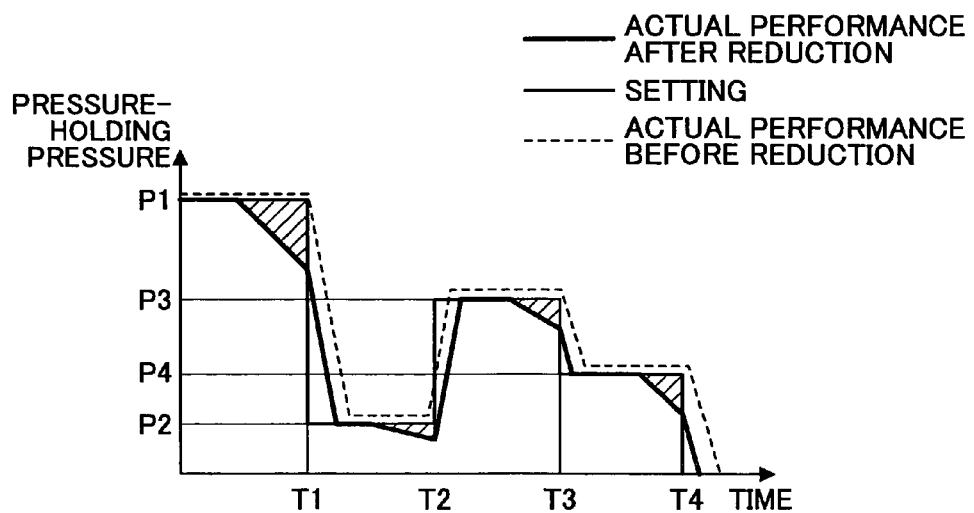
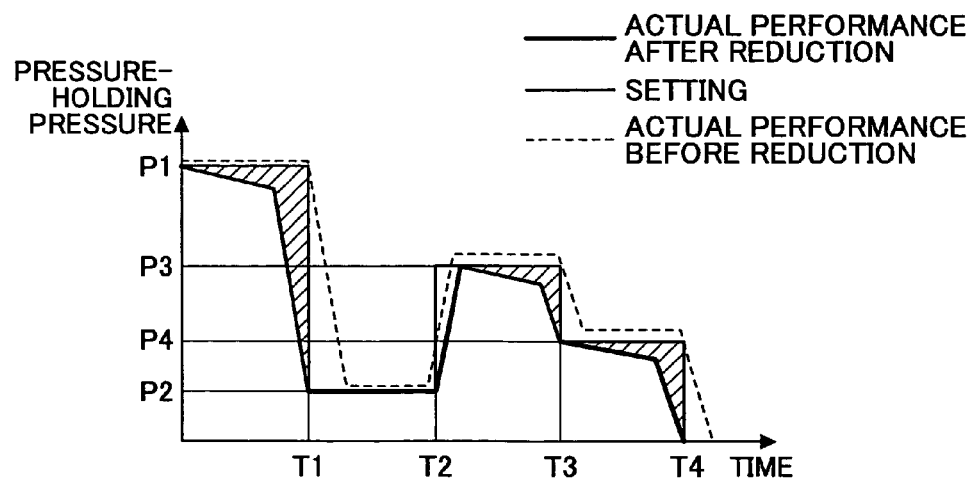

INJECTION MOLDING MACHINE AND A CONTROL METHOD OF AN INJECTION MOLDING MACHINE

CROSS-REFERENCE TO RELATED APPLICATIONS

This application is a U.S. continuation application filed under 35 U.S.C. 111(a) claiming benefit under 35 U.S.C. 120 and 365(c) of PCT application JP2004/004581, filed Mar. 31, 2004, which claims priority to Application Ser. No. 2003-102008, filed in Japan on Mar. Apr. 4, 2003. The foregoing applications are hereby incorporated herein by reference.

BACKGROUND OF THE INVENTION

1. Field of the Invention

The present invention relates to a control method and a control device of a molding machine and, more particularly, to a control method and a control device of a molding machine such as an electrically driven injection mold machine.

2. Description of the Related Art

A large part of an electric power consumed by an electrically driven injection molding machine is consumed by rotating equipments, that is, electric motors except for an electric power for a heater provided around a heating cylinder for melting a resin. There are various electric motors such as a motor for injection, a motor for screw rotation, a motor for mold clamping, a motor for an ejector, etc, which are incorporated into an electrically driven injection molding machine.

Here, in order to reduce an electric power consumption of a motor, what is necessary is just to reduce an electric current. That is, what is necessary is to reduce a force at a portion which applies a large force continuously. One of processes that needs a continuous large force is a pressure holding process. The pressure holding process is a process for applying a constant pressure to a screw so as to shape a molded article within a mold after a filling process for filling a melted resin into a mold by causing the screw to move forward within a heating cylinder by a motor for injection.

As an example of the pressure holding process, there is known a process which can set a holding pressure in at a plurality of stages (here, four stages) by an input device to a control device of an injection molding machine as shown in FIG. 1. Specifically, a pressure setting value and a keeping time of a holding pressure are set by an operator through the input device. As a result, the control device performs a pressure holding control to hold the setting value of the holding pressure set for each stage through a driver of a motor for injection.

As shown in FIG. 1, when a holding pressure is set up, a pressure actual result value of each actual stage changes as shown in FIG. 2. That is, the pressure actual result value changes with certain slope after a set time period has passed, and reaches a pressure setting value of a subsequent stage.

The following patent document 1 suggests a technique which can set the slope with a plurality of kinds.

Patent document 1): Japanese Laid-Open Patent Application No. 2001-293762 (first page, FIG. 3)

According to the suggestion in the Patent Document 1, especially when the pressure is decreasing, for example, when shifting from a pressure setting of a first stage to a pressure setting of a second stage, a control is made so that the pressure setting value of the second stage is reached after a time T1 with a delay of time ΔT although the pressure setting value of the second stage is reached at the time T1. This means that an electric power of a motor corresponding to an area indicated by dotted lines is consumed excessively.

However, with the shift from a hydraulic drive system to an electric drive system in recent injection molding machines, a reduction in a power consumption is has become a very important issue. Accordingly, the above-mentioned excessive power consumption is not preferable in a point of view of the reduction in power consumption.

SUMMARY OF THE INVENTION

It is a general object of the present invention to provide an improved and useful control method and control device of an injection molding machine in which the above-mentioned problems are eliminated.

A more specific object of the present invention is to provide a control method and a control device of an injection molding machine in which a power consumption of a motor used is reduced.

In order to achieve the above-mentioned objects, there is provided according to one aspect of the present invention a control method of controlling an input to a motor incorporated in an injection molding machine, comprising: setting a setting value for an output of the motor to be held for a predetermined setting time; setting a reduction ratio to reduce the setting value in accordance with passage of time; and controlling the input to the motor based on the reduction ratio.

In the above-mentioned control method, the reduction ratio may be determined by setting a setting value at an end of holding. Alternatively, the reduction ratio may be determined by setting a time of starting reduction. Additionally, the reduction ratio may be determined by setting a setting value at an end of holding and a time of starting reduction. Further, a reduction ratio determined by setting a setting value at a time of end of holding and a reduction ratio determined by setting a time of starting reduction may be combined, and the reduction ratio may be determined by selecting one of the reduction ratios which causes the setting value to be smaller in a part where the two reduction ratios exist.

In the above-mentioned control method, when a plurality of values are set as the setting value in accordance with passage of time, an input to the motor corresponding to each of the plurality of values is reduced at the same reduction ratio or reduction ratios different from each other.

Additionally, in the above-mentioned control method, the motor may be a motor for injection and the plurality of values of the setting value may be pressures to be held in a pressure-holding process of an injection molding process.

Additionally, there is provided according to another aspect of the present invention an injection molding machine having a control device for controlling an input to an incorporated motor, the control device comprising: setting means for setting a setting value for an output of the motor to be held for a predetermined setting time; determining means for determining a reduction ratio to reduce the setting value in accordance with passage of time; and controlling the input to the motor based on the reduction ratio.

In the injection molding machine according to the above-mentioned invention, the determining means may determine the reduction ratio by setting a setting value at an end of holding. Alternatively, the determining means may determine the reduction ratio by setting a time of starting reduction. Additionally, the determining means may determine the reduction ratio by setting a setting value at an end of holding and a time of starting reduction. Further, the determining means may combine a reduction ratio determined by combining a reduction ratio determined by setting a setting value at a time of end of holding and a reduction ratio determined by setting a time of starting reduction, and may determine the reduction ratio by selecting one of the reduction ratios which causes the setting value to be smaller in a part where the two reduction ratios exist.

Additionally, in the injection molding machine according to the above-mentioned invention, when a plurality of values are set as the setting value in accordance with passage of time, the control device causes to reduce an input to the motor corresponding to each of the plurality of values according to the same reduction ratio or reduction ratios different from each other.

Further, in the injection molding machine according to the present invention, the motor may be a motor for injection and the plurality of values of the setting value may be pressures to be held in a pressure-holding process of an injection molding process.

As mentioned above, there is provided according to the present invention a control method of a molding machine which contributes to a reduction of a power consumption of a motor and a molding machine which can perform such as control method.

Other objects, features and advantages of the present invention will become more apparent be reading the following detailed description while referring to the accompanying drawings.

BRIEF DESCRIPTION OF THE DRAWINGS

FIG. 8 is a graph showing a change of a pressure that is controlled using a control method according to a third embodiment of the present invention; and FIG. 9 is a graph showing a change of a pressure that is controlled using a control method according to a fourth embodiment of the present invention.

DETAILED DESCRIPTION OF THE PREFERRED EMBODIMENTS

A description will be given below, with reference to the drawings, of an embodiment of the present invention.

First, a description will be given, with reference to FIG. 3, of an electric type injection molding machine as an example of a molding machine to which the present invention is applicable.

Figure 3:
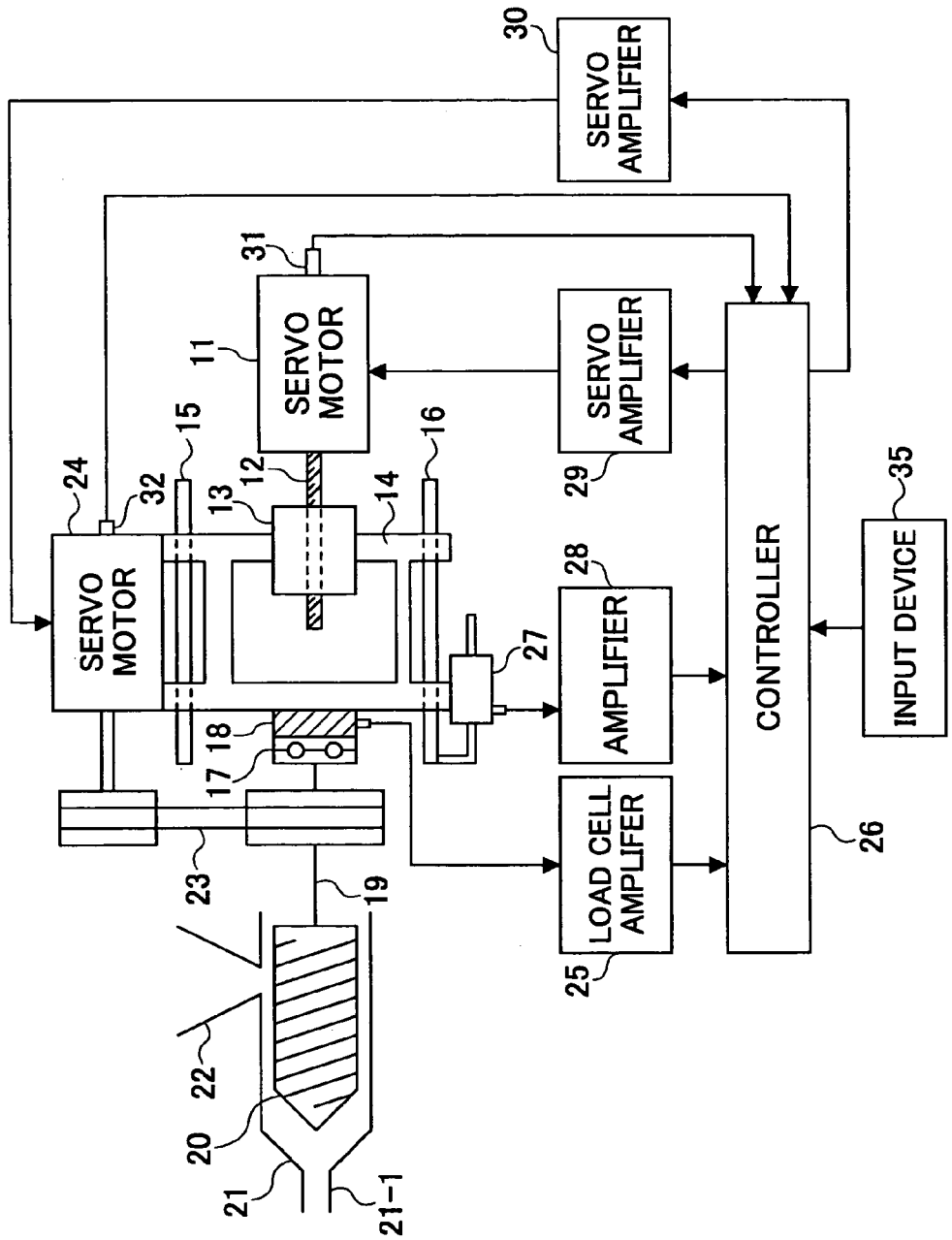
FIG. 3 is a diagram showing a structure of an injection molding machine to which the present invention is applicable.
Figure 4A:
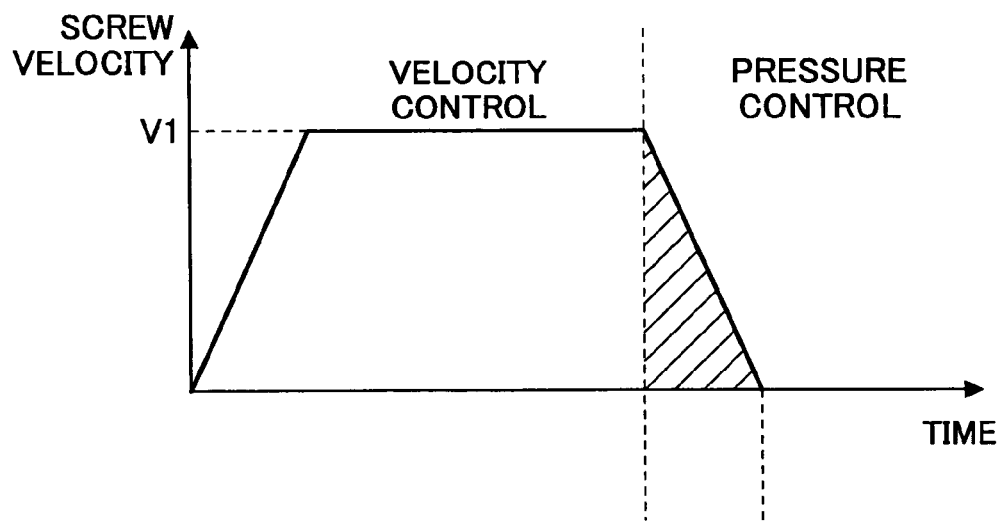
FIG. 4A is a graph showing a change in a screw speed in a filling process.
Figure 4B:
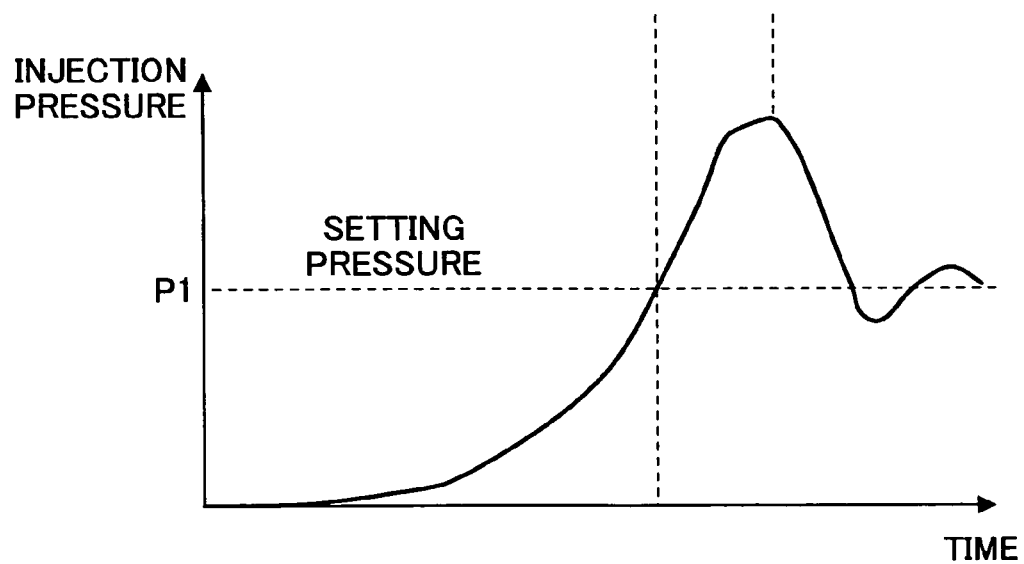
FIG. 4B is a graph showing a change in an injection pressure in the filling process.

In FIG. 3, a rotation of a servo motor 11 for injection is transmitted to a ball screw 12. A nut 13, which moves forward and rearward by the rotation of the ball screw 12, is fixed to a pressure plate 14. The pressure plate 14 is movable along guide bars 15 and 16 that are fixed to a base frame (not shown in the figure). The forward and rearward movement of the pressure plate 14 is transmitted to a screw 20 through a bearing 17, a load cell 18 and an injection shaft 19. The screw 20 is rotatably and movably arranged in an axial direction. A heating cylinder 21 corresponding to a rear part of the screw 20 is provided with a hopper for supplying a resin. A rotational movement of a servo motor 24 for screw rotation is transmitted to the injection shaft 19 through a coupling member 23 such as a belt, a pulley, etc. That is, the screw 20 is rotated by the injection shaft being rotationally driven by the servo motor 24 for screw rotation.

In a plasticization/measurement process, a melted resin is stored in a front part of a screw 20, i.e., a nozzle 21-1 side of the heating cylinder 21 by the screw 20 moving rearward while rotating within the heating cylinder 21. In a filling process, the melted resin stored in front of the screw 20 is filled in a mold die and pressurized so as to carry out molding. At this time, a force pressing the resin is detected as a reaction force by a load cell 18. That is, a resin pressure in front of the screw is detected. The detected pressure is amplified by a load cell amplifier 25, and is input to a controller 26 (control device) that functions as control means.

A position detector 27 is attached to a pressure plated 14 so as to detect an amount of movement of the screw 20. A detection signal of the position detector 27 is amplified by an amplifier 28 and input to the controller 26. The detection signal is also used to detect a moving speed of the screw 20.

The controller 26 outputs current (torque) instructions according to each of the above-mentioned plurality of processes to the servo amplifiers 29 and 30 in accordance with various setting values that have been previously set by an operator through an input device 35. The servo amplifier 29 controls an output torque of the servo motor 11 by controlling a drive current of the servo motor 11. The servo amplifier 30 controls a rotational speed the servo motor 24 by controlling a drive current of the servo motor 24. The servo motors 11 and 24 are provided with encoders 21 and 32, respectively, so as to detect rotational speeds. The rotational speeds detected by the respective encoders 31 and 32 are input to the controller 26.

It should be noted that the structure of the injection molding machine shown in FIG. 3 is merely for the sake of convenience to explain an outline of an injection molding machine, and it is mere an example of an injection molding machine.

As mentioned above, the injection molding machine measures a resin while melting by heating, and extruding it into the molding die to so as to mold a product. That is, a melted resin measured in front of the screw 20 in the measuring process is filled in a cavity space in the molding die by the screw moving forward after a mold closing process to form the cavity space in the molding die by closing a movable die and a stationary die by driving a die clamping device arranged opposite to the injection device.

Figure 1:
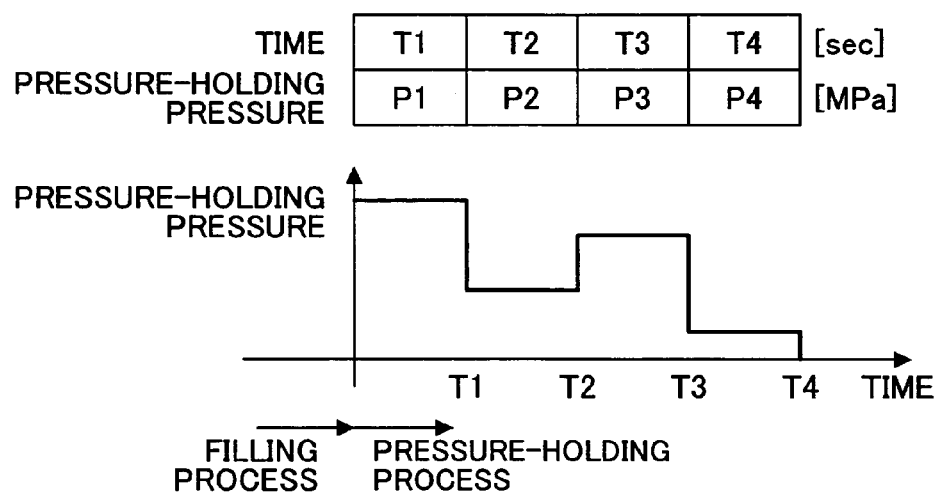
FIG. 1 is an illustration for explaining a pressure holding pressure setting value in a conventional pressure holding control process.

After the resin is filled in the molding die through the above-mentioned filling process, the molding operation proceeds to a pressure holding process so as to maintain a resin pressure of a certain degree to shape the resin in the molding die. In the pressure holding process, the screw 20 is moved forward and rearward in accordance with a pressure change pattern as shown in FIG. 1 so that a desired resin pressure is maintained.

Next, a description will be given of the concept of the present invention.

Figure 2:
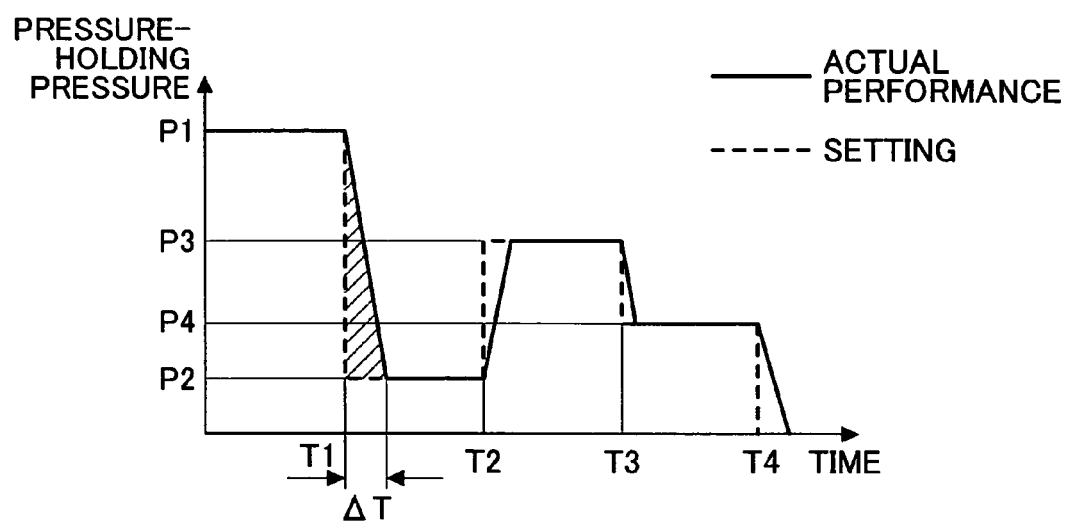
FIG. 2 is a graph showing a actual pressure change in the holding pressure control process shown in FIG. 1.

Here, considering reducing the power consumption of the servo motor 31 for moving the screw 20, it can be appreciated that the power consumption of the motor can be made small by causing an area of the hatched portion in the graph shown in FIG. 2. That is, an amount of work, i.e., a power consumption of can be reduced by reducing a portion where the motor does not actually carry out a work to pressurize the resin in the pressure control process to shape the form of a molded product.

The amount of work of the motor is reducible by the method as shown in FIGS. 5A through 5D. That is, when a setting pattern that maintains a certain pressure set point P for only a certain setup time T is taken into consideration, there are considered the following reducing methods.

Figure 5A:
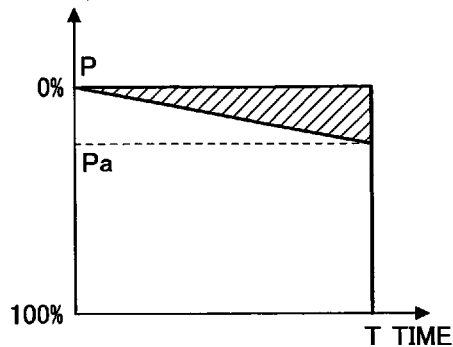
FIGS. 5A, 5B, 5C and 5D are graphs showing examples of a pressure decreasing pattern used for reducing an amount of work of a motor according to the present invention.

When the hatched portion is set to be a reduction area, FIG. 5A shows a method to reduce an amount of work of the motor by operating only a pressure. When a pressure reduction ratio: $Pr=Pa/P$ (where, $Pa<P$) (%), which is a ratio of a setting pressure P and a pressure Pa at the time of completion of a pressure holding, is set by the input device 35, the controller 26 (control device) produces a pressure setting pattern that reduces the setting pressure from P to Pa while a setting time T passes so as to control a driver 31 of the servo motor 11 so that a power is supplied to the servo motor 11 according to the produced pressure setting pattern. In this case, when switched to the pressure holding process, the screw control is changed to a pressure control so as to be controlled according to a pressure pattern determined by a pressure reduction ratio so that the pressure Pa at the time of completion of the pressure holding is reached from the setting pressure P. Then, the setting pressure starts to decrease at the time of start of the pressure holding, and reaches the pressure Pa at the pressure holding completion time (time T).

Figure 5B:
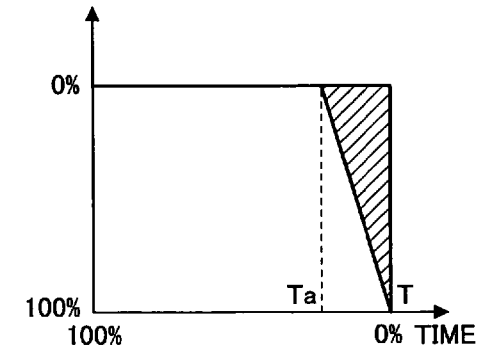

FIG. 5B shows a method of reducing an amount of work of a motor by controlling only a time. When a time reduction ratio: $Tr=Ta/P$ (where, $Ta<T$) (%), which is a ratio of a setting time T at a time of start of reduction and a setting value T of a pressure holding completion time, is set by the input device, the controller 26 (control device) produces a pressure setting pattern that reduces the pressure from a time T1 toward the time T so as to control the driver 31 of the servo motor 11 so that a power is supplied to the servo motor 11 according to the produced pressure setting pattern. When switched to the pressure holding process, the screw control is changed to a pressure control so that the pressure control of the screw is started according to the setting pressure P, and when the time Ta of starting reduction is reached a control is made according to the pressure pattern determined by the time reduction ratio Tr so that it reaches the setting value T of the pressure holding completion time from Ta. Then, the setting pressure starts to decrease at the time Ta after the start of the pressure holding, and reaches a next setting pressure at the pressure holding completion time (time T).

Figure 5C:
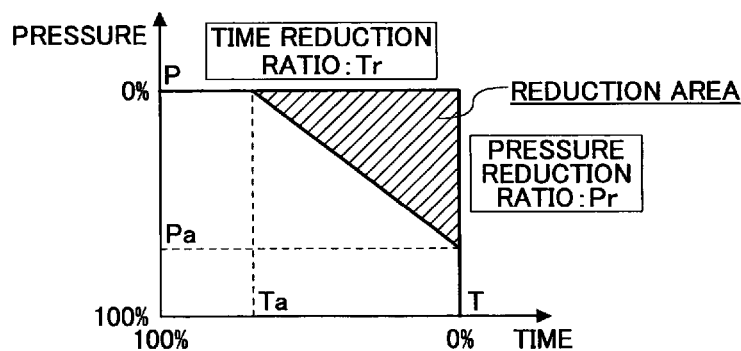

Moreover, FIG. 5C shows a method of setting both the pressure reduction ratio: $Pr=Pa/P$ (%) and the time reduction ratio: $Tr=Ta/T$ (%). In this case, the screw is controlled according to a pressure pattern defined to connect Ta and Pa by a straight line. Then, the setting pressure starts to decrease from the time Ta and reaches the pressure Pa at the time T. The controller 26 produces a pressure pattern according which the pressure starts to decrease at the time Ta and reaches the pressure Pa at the time T so as to control the driver 31 of the servo motor 11 so that a power is supplied to the servo motor 11 in accordance with the produced pressure setting pattern.

Figure 5D:
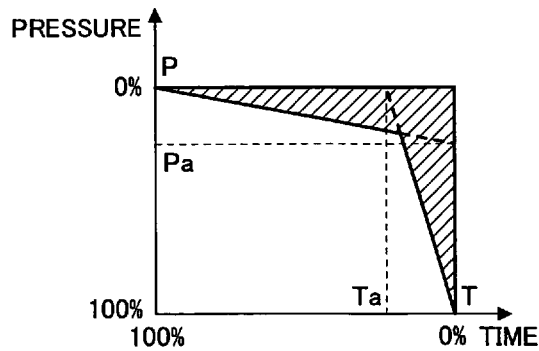

Furthermore, FIG. 5D shows a method of selecting a smaller value of the pressure obtained from the reduction ratios between both the pressure reduction ratio: $Pr=Pa/P$ (%) and the time reduction ratio: $Tr=Ta/T$ (%). The controller 26 produces a pressure sitting pattern according to which the pressure starts to decease from the pressure holding start time and reaches a next setting pressure at the time T by selecting a smaller value between the pressures obtained from both the pressure reduction ratio and the time reduction ratio, and controls the driver of the servo motor 11 so that a power is supplied to the servo motor 11 in accordance with the produced pressure setting pattern.

The portions corresponding to the amount of work reduced by the above mentioned methods are portions where the servo motor 11 does not actually carry out work, and, thus, there is no problem for the pressure control to shape a form of a molded product.

The present invention relates to the control method to control an input power to a motor based on the above-mentioned concept. A description will be given below of embodiments thereof.

Figure 6:
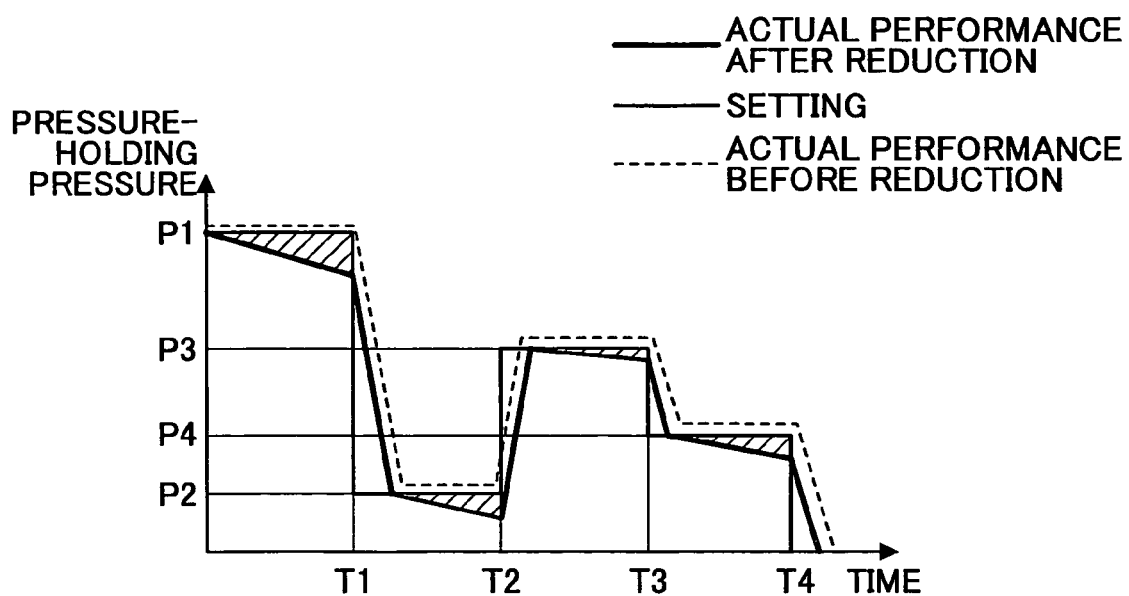
FIG. 6 is a graph showing a change of a pressure that is controlled using a control method according to a first embodiment of the present invention.

FIG. 6 is a graph showing a pressure-time characteristic for explaining the control method according to a first embodiment of the present invention. In the example shown in FIG. 6, a pressure-holding pressure is set at four levels, and a setting pressure (pressure-holding pressure) is controlled according to a method shown in FIG. 5A at each level. That is, it is permitted so that the pressure reduction ratio Pr can be set individually for each of the four levels. In FIG. 6, hatched portions indicate the reduction area. It should be noted that the same pressure reduction ratio Pr may be set for all of the four levels together.

Figure 7:
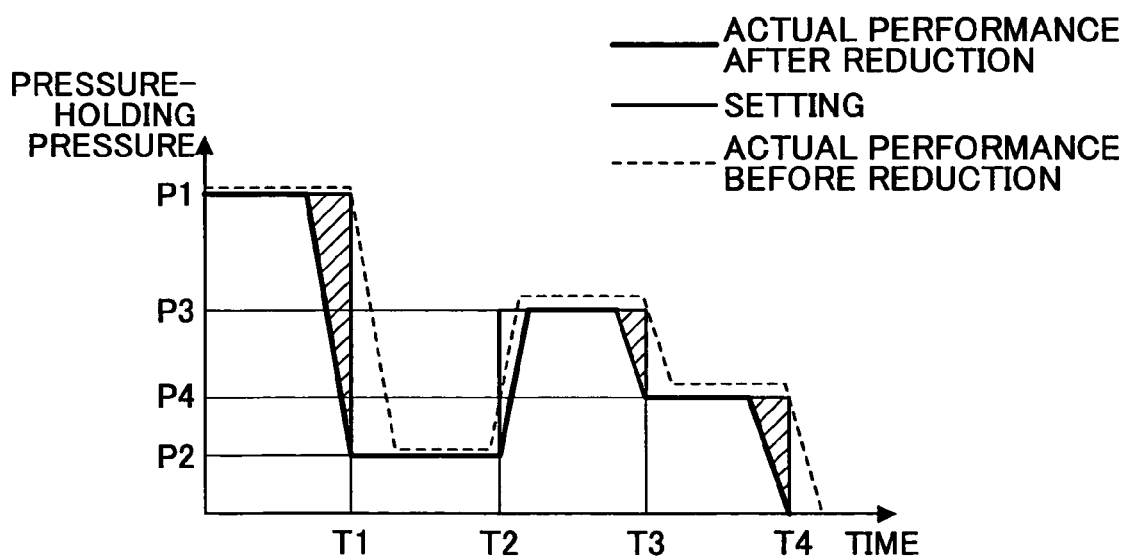
FIG. 7 is a graph showing a change of a pressure that is controlled using a control method according to a second embodiment of the present invention.

FIG. 7 is a graph showing a pressure-time characteristic for explaining the control method according to a second embodiment of the present invention. In the example shown in FIG. 7, a pressure-holding pressure is set at four levels, and a setting pressure (pressure-holding pressure) is controlled according to a method shown in FIG. 5B at each level. That is, it is permitted so that the time reduction ratio Tr can be set individually for each of the four levels. In FIG. 7, hatched portions indicate the reduction area. It should be noted that the same pressure reduction ratio Tr may be set for all of the four levels together.

FIG. 8 is a graph showing a pressure-time characteristic for explaining the control method according to a third embodiment of the present invention. In the example shown in FIG. 8, a pressure-holding pressure is set at four levels, and a setting pressure (pressure-holding pressure) is controlled according to a method shown in FIG. 5C at each level. That is, it is permitted so that the pressure reduction ratio Pr and the time reduction ratio Tr can be set individually for each of the four levels. In FIG. 8, hatched portions indicate the reduction area. It should be noted that the same pressure reduction ratio Pr and the same time reduction ratio Tr may be set for all of the four levels together.

FIG. 9 is a graph showing a pressure-time characteristic for explaining the control method according to a fourth embodiment of the present invention. In the example shown in FIG. 9, a pressure-holding pressure is set at four levels, and a setting pressure (pressure-holding pressure) is controlled according to a method shown in FIG. 5D at each level. That is, a setting pressure is controlled at each of the four levels by selecting the smaller one of values of pressure obtained from both the pressure reduction ratio Pr and the time reduction ratio Tr. In FIG. 9, hatched portions indicate the reduction area. It should be noted that the same pressure reduction ratio Pr and the same time reduction ratio Tr may be set for all of the four levels together.

It should be noted that, in FIG. 6 through FIG. 9, fine solid lines indicate a pressure setting pattern, bold solid lines indicate a pressure change pattern, and dashed lines a pressure change pattern when the control method according to the present invention is not applied. Especially, the dashed lines are indicated by shifting from the solid parts for the sake of convenience, since there are portions overlapping with the solid part.

In the above-mentioned control method, values of the setting pressure, the pressure reduction ratio Pr and the time reduction ratio Tr are input to the controller 26 by an operator through the input device 35. Additionally, the graphs shown in FIG. 6 through FIG. 9 are displayed on a display (not shown in the figure) of the molding machine so that the respective set reduction ratios can be displayed at T in a field of time and P in a field of pressure-holding pressure.

Then, upon receipt of the reduction ratio input from the input device 35, the controller 26 produces pressure setting pattern such as shown in FIG. 6 through FIG. 9 in accordance with the values thereof, and provides an electric power value, which is to be applied to the motor, to the motor in accordance with the produced pressure setting pattern. Thereby, the output of the servo motor is controlled so that a resin pressure is controlled in accordance with the pressure setting pattern.

According to the above-mentioned control methods, an amount of work of the motor can be reduced by the hatched portions, and, thus, a power consumption of the motor can be reduced.

Additionally, for example, according to the control methods according to the above-mentioned second embodiment (FIG. 7) and fourth embodiment (FIG. 9), different from the example shown in FIG. 2 in which a pressure is caused to follow a pressure of a subsequent stage after a set time has passed, the intention of the setting can be correctly represented since it is assured that the pressure of the subsequent stage has been reached when the set time has passed. Thereby, it becomes possible to respond flexibly to a phenomenon of generation of "warp" when stress concentration occurs in a molded product or, on the contrary, generation of "surface sink" caused by an insufficient stress.

It should be noted that although the description was given in the above-mentioned embodiment of the pressure-holding pressure setting pattern provided to the motor for injection to obtain a pressure-holding pressure in a pressure-holding process of the electric type injection molding machine, it is not limited to the electric type as mentioned above. That is, there are provided various motors in either an injection molding machine other than that of the electric type or a molding machine other than injection molding machines. Among them, the present invention is applicable to a motor that is driven in accordance with a setting pattern of a plurality of levels in which a setting value stepwisely changes as shown in FIG. 1 and FIG. 2.

The present invention is not limited to the specifically disclosed embodiments, and variations and modifications may be made without departing from the scope of the present invention.

What is claimed is:

1. A control method of controlling an input to a motor incorporated in an injection molding machine based on a setting pressure so as to reduce energy consumption of said motor, comprising:
   setting a pressure setting value for an output of the motor to be held for a predetermined setting time;
   setting a reduction ratio to reduce the pressure setting value in accordance with passage of time; and
   controlling the input to said motor based on the reduction ratio.

2. The control method as claimed in claim 1, wherein said reduction ratio is determined by setting a setting value at an end of a pressure holding process.

3. The control method as claimed in claim 1, wherein said reduction ratio is determined by setting a time of starting reduction.

4. The control method as claimed in claim 1, wherein said reduction ratio is determined by setting a setting value at an end of a pressure holding process and a time of starting reduction.

5. The control method as claimed in claim 1, wherein a first reduction ratio determined by setting a setting value at a time of end of a pressure holding process and a second reduction ratio determined by setting a time of starting reduction are combined, and said reduction ratio is determined by selecting one of the first reduction ratio and the second reduction ratio, which causes said setting value to be smaller in a part where the two reduction ratios would both exist.

6. The control method of as claimed in claim 1, wherein said setting value is set to a plurality of sequential values in accordance with passage of time, and an input to said motor corresponding to each of the plurality of values is reduced at a same reduction ratio or at reduction ratios different from each other.

7. The control method as claimed in claim 6, wherein said motor is a motor for injection and the plurality of values of said pressure setting value are pressures to be held in a pressure-holding process of an injection molding process.

8. An injection molding machine having a control device for controlling an input to an incorporated motor so as to reduce energy consumption of said motor, the control device comprising:
   setting means for setting a pressure setting value for an output of the motor to be held for a predetermined setting time; and
   determining means for determining a reduction ratio to reduce the pressure setting value in accordance with passage of time;
   wherein the control device is configured to control the input to said motor based on the reduction ratio.

9. The injection molding machine as claimed in claim 8, wherein said determining means determines said reduction ratio by setting a setting value at an end of a pressure holding process.

10. The injection molding machine as claimed in claim 8, wherein said determining means determines said reduction ratio by setting a time of starting reduction.

11. The injection molding machine as claimed in claim 8, wherein said determining means determines said reduction ratio by setting a setting value at an end of a pressure holding process and a time of starting reduction.

12. The injection molding machine as claimed in claim 8, wherein said determining means combines a first reduction ratio determined by combining a reduction ratio determined by setting the pressure setting value at a time of end of a pressure holding process and a second reduction ratio determined by setting a time of starting reduction, and determines said reduction ratio by selecting one of the first reduction ratio and the second reduction ratio, which causes said pressure setting value to be smaller in a part where the first reduction ratio and the second reduction ratio would both exist.

13. The injection molding machine as claimed in claim 8, wherein said setting value is set to a plurality of sequential values in accordance with passage of time, and said control device reduces an input to said motor corresponding to each of the plurality of values according to a same reduction ratio or to reduction ratios different from each other.

14. The injection molding machine as claimed in claim 13, wherein said motor is a motor for injection and the plurality of sequential values are pressures to be held in a pressure-holding process of an injection molding process.

* * * * *